(12) United States Patent
Nakazawa et al.

(10) Patent No.: US 8,248,726 B2
(45) Date of Patent: Aug. 21, 2012

(54) HARD DISK DRIVE

(75) Inventors: Keiji Nakazawa, Chiba (JP); Masaki Sansawa, Chiba (JP); Shinji Kinoshita, Chiba (JP)

(73) Assignee: Seiko Instruments Inc. (JP)

( * ) Notice: Subject to any disclaimer, the term of this patent is extended or adjusted under 35 U.S.C. 154(b) by 869 days.

(21) Appl. No.: 11/899,664

(22) Filed: Sep. 6, 2007

(65) Prior Publication Data

US 2008/0068744 A1    Mar. 20, 2008

(30) Foreign Application Priority Data

Sep. 15, 2006  (JP) ................................. 2006-250636
Jul. 30, 2007  (JP) ................................. 2007-196859

(51) Int. Cl.
*G11B 17/022*    (2006.01)
(52) U.S. Cl. ................................. 360/99.12; 360/98.08
(58) Field of Classification Search ............... 360/98.07, 360/99.08, 99.12, 98.08
See application file for complete search history.

(56) References Cited

U.S. PATENT DOCUMENTS

| | | | |
|---|---|---|---|
| 6,181,509 B1 * | 1/2001 | Canlas et al. | 360/97.12 |
| 6,417,987 B1 * | 7/2002 | Khan et al. | 360/97.02 |
| 7,582,996 B2 * | 9/2009 | Yamamoto et al. | 310/90 |
| 2001/0007520 A1 * | 7/2001 | Matsumoto et al. | 360/99.08 |
| 2004/0061404 A1 * | 4/2004 | Fujii et al. | 310/216 |
| 2006/0171615 A1 * | 8/2006 | Kodama | 384/100 |
| 2006/0267434 A1 * | 11/2006 | Kodama | 310/90 |
| 2007/0159717 A1 * | 7/2007 | Miyajima et al. | 360/99.12 |

FOREIGN PATENT DOCUMENTS

| | | | | |
|---|---|---|---|---|
| JP | 53026716 | A | * | 3/1978 |
| JP | 63147976 | A | * | 6/1988 |
| JP | 04310662 | A | * | 11/1992 |
| JP | 2005228443 | | | 8/2005 |
| JP | 2006144031 | A | * | 6/2006 |
| JP | 2006155864 | | | 6/2006 |
| JP | 2006155864 | A | * | 6/2006 |
| JP | 2006228684 | A | * | 8/2006 |

OTHER PUBLICATIONS

Japanese citation of references, published on Nov. 17, 2011 in Japan.*

* cited by examiner

*Primary Examiner* — Will J Klimowicz
(74) *Attorney, Agent, or Firm* — Adams & Wilks

(57) ABSTRACT

A hard disk drive has an information recording medium that is rotationally driven for recording and/or reproducing information and a rotor hub that supports the information recording medium. The rotor hub has a flat mounting surface disposed in an outer circumferential portion thereof and on which the information recording medium is mounted so as to contact an edge portion of the mounting surface. The mounting surface is made of stainless steel containing a machineability improving additive, except for selenium and tellurium, for improving the machineability of the mounting surface. At least one of the edge portion or a portion of the mounting surface in the vicinity of the edge portion contains surface pores formed by component particles of the additive falling from the mounting surface. Each of the pores has a length less than 10 μm in a circumferential direction of the mounting surface.

6 Claims, 7 Drawing Sheets

HARD DISK DRIVE

BACKGROUND OF THE INVENTION

1. Field of the Invention

The present invention relates to a hard disk drive.

2. Description of the Related Art

In recent years, an information recording/reproducing apparatus employing a hard disk drive (hereinafter, referred to as "HDD") is being widely used in a portable music player, a mobile phone, or the like. The information recording/reproducing apparatus is desired to be further downsized. Accordingly, the HDD to be mounted to the information recording/reproducing apparatus is also desired to be downsized and thinned.

In view of the above, an information recording medium (hereinafter, referred to as "magnetic disk") used in the HDD has a higher recording density, and thus attaining a larger capacity. Along with the attainment, a small (small in diameter) and thin magnetic disk is being developed.

The magnetic disk is mounted onto a disk mounting surface provided to a rotor hub of a spindle motor for driving the HDD. An upper surface of the magnetic disk is pressurized by a disk clamper, and the magnetic disk is thus fixed. The magnetic disk rotates at high speed together with the rotor hub of the spindle motor in recording/reproducing the information. Since the magnetic disk has the larger capacity, in order to accurately perform the information recording/reproducing, requirements to the magnetic disk, such as a rotational speed and a rotation precision, are becoming severer.

The rotor hub of the spindle motor as described above has employed a ferritic stainless steel in consideration of the following advantages.

(1) A ferritic stainless steel has good machinability, so a dimensional precision is readily secured.
(2) A ferritic stainless steel has a coefficient of linear expansion similar to that of a material (glass) of the magnetic disk.
(3) A ferritic stainless steel has corrosion resistance to a certain extent.

Further, since the magnetic disk has the larger capacity, in order to accurately perform the information recording/reproducing, deformation of the magnetic disk mounted on the disk mounting surface is required to be minimized. Accordingly, flatness of the disk mounting surface of the rotor hub, which is brought into contact with the magnetic disk, should have a flatness close to that of the disk.

As a related art, to solve the problems described above, there is proposed a technique in JP 2006-155864 A, in which the disk mounting surface of the rotor hub is finished while leaving spiral cutting marks. In this case, surface roughness is increased due to the cutting marks. However, because the magnetic disk is supported only by the projecting portions of the cutting marks, so distortion of the magnetic disk decreases. Note that examples of a material of the rotor hub include, in addition to a ferritic free-machinable stainless steel, a martensite-based stainless steel, an austenitic stainless steel, aluminum, alloy thereof, brass, copper alloy, various kinds of steel, and machinable materials having proper hardness.

Further, a ferritic stainless steel has good machinability to a certain extent. However, it is difficult to control the disk mounting surface so as to have the flatness of 1 μm or less. That is, the flatness (processing accuracy) of a machine-processed surface suffers from affects of vibration generated by load of a processing machine (e.g., lathe) with respect to the spindle and vibration generated by a cutting tool. Thus, in order to improve the flatness, selection of a material having good machinability is required. Accordingly, the machinability of the ferritic stainless steel is poor in order to secure the flatness of 1 μm or less for the disk mounting surface.

In order to solve the problems concerning the flatness to reduce the deformation of the magnetic disk, for example, JP 2005-228443 A discloses a structure in which a spacer is interposed below the disk mounting surface.

Along with attainment of the magnetic disk having a larger capacity and a thinner structure, in the related rotor hub made of a ferritic stainless steel (product name: SF20T, manufactured by Shimomura Tokushu Seiko Co., Ltd.), affects of various additives added to improve the machinability thereof does not become neglectable. Examples of the additives for improving the machinability include sulfur (S), tellurium (Te), selenium (Se), lead (Pb), and manganese (Mn).

To be specific, the inventors of the present invention have found that, when component particles of the additive fall from the disk mounting surface of the rotor hub, there are formed recessed portions of minute pores caused by the fallen particles on the disk mounting surface. Such failings of the component particles are particularly caused by tellurium among the additives for improving the machinability.

FIG. 7 is a photograph showing a cross section of a rotor hub 12' while the cross section is taken at 400-magnification. In the cross section, there exist a large number of elongated component particles P.

When the rotor hub 12' is machine-processed to form the disk mounting surface 15', the component particles P present in the machined surface and the vicinity thereof and exposed to the disk mounting surface 15' sometimes fall. Accordingly, at portions of the disk mounting surface 15' from which the component particles P have fallen, there are formed recessed portions (spaces) of the fallen-particle pores.

FIG. 8 is an enlarged photograph showing a vicinity of an outer-circumferential-side edge portion of the disk mounting surface 15', having a ring shape in a plan view. There exist recessed portions of relatively-large fallen-particle pore D having a length DL in a circumferential direction of more than 10 μm. It has been found that, when such recessed portions exist on the disk mounting surface, the thin magnetic disk which is fixed by the application of a pressing force of the disk clamper, distorts at the recessed portions, causing minute deformation.

In addition, it has been found that, with regard to projecting portions of cutting marks on the disk mounting surface 15', when there exist pores (having a length DB in a diameter direction) on at least both a projecting portion located in an outermost circumference and a projecting portion located adjacent thereto inwardly, even though the length DL of the pores in the circumferential direction is less than 10 μm, the pores largely affect on the minute deformation of the magnetic disk.

In other words, it has been found that, in a high-density magnetic disk, when there exists on the disk mounting surface recessed portions of minute pores caused by fallen particles of an additive, the minute deformation caused by the fallen-particle pores hinders accurate recording/reproducing of information.

Note that the disk mounting surface 15' has a minute width, e.g., about 0.25 mm, and only supports an inner-circumferential-side edge portion of the ring-shaped magnetic disk.

FIG. 9 shows a state where a magnetic disk which is minutely deformed on the disk mounting surface 15' having the fallen-particle pore D of FIG. 8. Referring to FIG. 9, there generates deformation in which the inner-circumferential-side edge portion of the magnetic disk supported by the disk mounting surface 15' is recessed, and an outer-circumferential-side edge portion is projected. In the example of FIG. 9, there generates a deformation in which the largest recess (−1.83343 μm) occurs in the vicinity of a portion where the fallen-particle pore D exists, and the largest protrusion (+1.23012 μm) generates in an outer circumferential portion of a circle substantially having the same radius. A maximum deformation amount, which is obtained by summing the largest recess and the largest protrusion, is 3 μm or more, and is a relatively large minute deformation.

With the above-mentioned background, there has been desired to develop a hard disk drive including a flat disk mounting surface which does not hinder accurate recording/reproducing of information even in employing the high-density magnetic disk, i.e., a flat disk mounting surface having no recessed portion which may cause relatively large minute deformation hindering accurate recording/reproducing.

SUMMARY OF THE INVENTION

The present invention has been made in view of the above-mentioned circumstances, and it is an object of the present invention to provide a hard disk drive including a flat disk mounting surface having no recessed portion which may cause minute deformation hindering accurate recording/reproducing.

In order to attain the object, the present invention adopts the following means.

A hard disk drive according to an aspect of the present invention includes: an information recording medium, which is rotationally driven for recording and reproducing information; a rotor hub including a mounting surface on which the information recording medium is mounted in an outer circumferential portion thereof; and a clamp for pressurizing and fixing the information recording medium to the mounting surface. In the hard disk drive, in an edge portion of the mounting surface and in the vicinity thereof to which the clamp pressurizes, pores having a length of 10 μm or more in a circumferential direction are not allowed to exist.

According to the hard disk drive, in the edge portion of the mounting surface or in the vicinity thereof to which the clamp pressurizes, the pores having a length of 10 μm or more in the circumferential direction do not exist. Thus, there causes no minute deformation hindering accurate recording/reproducing.

Further, according to another aspect of the present invention, the hard disk drive is characterized in that, among the projecting portions of the cutting marks on the mounting surface, pores do not exist on both a projecting portion located in an outermost circumference and a projecting portion located adjacent thereto inwardly.

Further, according to still another aspect of the present invention, there is provided a hard disk drive characterized by including: an information recording medium, which is rotationally driven for recording and reproducing information; a rotor hub including a mounting surface on which the information recording medium is mounted in an outer circumferential portion thereof; and a clamp for pressurizing and fixing the information recording medium to the mounting surface. In the hard disk drive, the mounting surface to which the clamp pressurizes is made of a stainless steel containing no tellurium (Te).

In each of the hard disk drives according to the above-mentioned aspects of the present invention, the mounting surface is preferably made of an austenitic stainless steel. This is because an austenitic stainless steel contains extremely less additive leading component particles to fall, and has machinability better than other stainless steels. Accordingly, the flat disk mounting surface causing no minute deformation hindering accurate recording/reproducing can be readily formed.

With the hard disk drive according to the above-mentioned aspects of the present invention, the mounting surface to which the clamp pressurizes is made of a stainless steel free from tellurium (Te). Thus, even though the mounting surface contains an additive for improving machinability, the mounting surface contains no tellurium. Thus, recessed portions are not formed caused by falling component particles exposed to a machined surface.

According to the present invention as described above, in the edge portion of the disk mounting surface to which the clamp pressurizes and in the vicinity thereof, there exists no recessed portion of relatively-large pores causing deformation of the magnetic disk. Thus, there generates no minute deformation hindering accurate recording/reproducing in the plate-like information recording medium. Accordingly, even when the high-density thin-plate-type magnetic disk is employed, information can be accurately recorded/reproduced. As a result, according to the present invention, an information recording/reproducing medium employing a hard disk drive can be downsized and thinned, and information can be accurately recorded/reproduced, which are extremely large effects.

BRIEF DESCRIPTION OF THE DRAWINGS

In the accompanying drawings:

FIG. 1 are views each showing a hard disk drive according to an embodiment of the present invention, in which.

DETAILED DESCRIPTION OF THE PREFERRED EMBODIMENTS

Hereinafter, a hard disk drive according to embodiments of the present invention will be described with reference to the accompanying drawings.

Figure 1A:
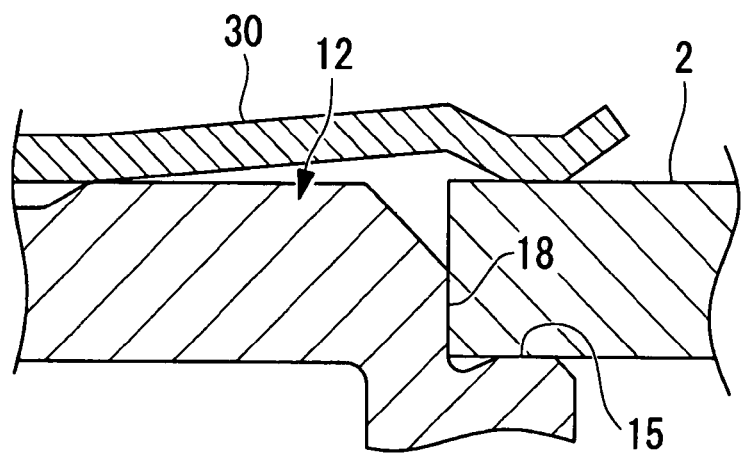
FIG. 1A is a main-portion enlarged cross-sectional view showing a disk mounting surface and the vicinity thereof.
Figure 1B:
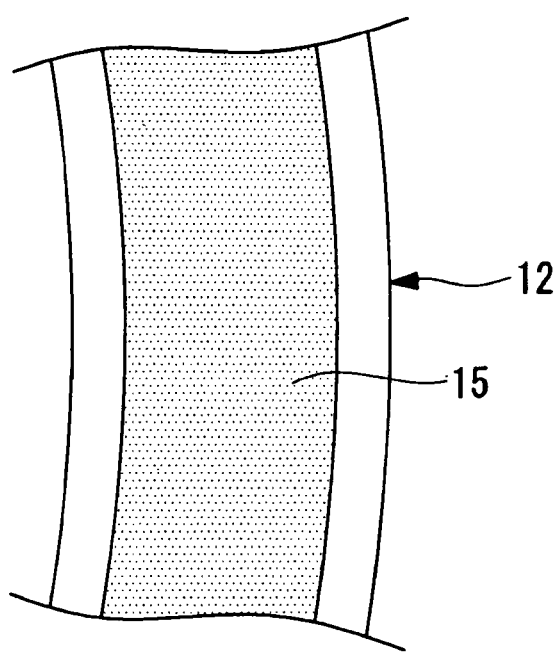
FIG. 1B is a partial plan view showing the disk mounting surface.

A hard disk drive (HDD) 1 according to an embodiment of the present invention includes, as shown in FIGS. 1A and 1B for example, a magnetic disk 2 rotationally driven, for performing recording/reproducing information, a rotor hub 12 including, in the outer circumferential portion thereof, a disk mounting surface 15 on which the magnetic disk 2 is mounted, and a clamp 30 for pressurizing and fixing the magnetic disk 2 to the disk mounting surface 15. Further, in the edge portion or in the vicinity of the disk mounting surface 15 to which the pressurizing force by the clamp 30 is applied, in order to prevent deformation hindering accurate recording/reproducing from generating, recessed portions of pores having a length of 10 μm or more in a circumferential direction are not allowed to exist. In addition, with regard to projecting portions of cutting marks on the disk mounting surface 15, pores are not allowed to exist on both a projecting portion located in an outermost circumference and a projecting portion located adjacent thereto inwardly. The HDD 1 writes (records) and reads out (reproduces) information in and out of the magnetic disk 2, which is an information storage medium rotationally driven by a motor, by using a magnetic head (not shown).

Figure 2:
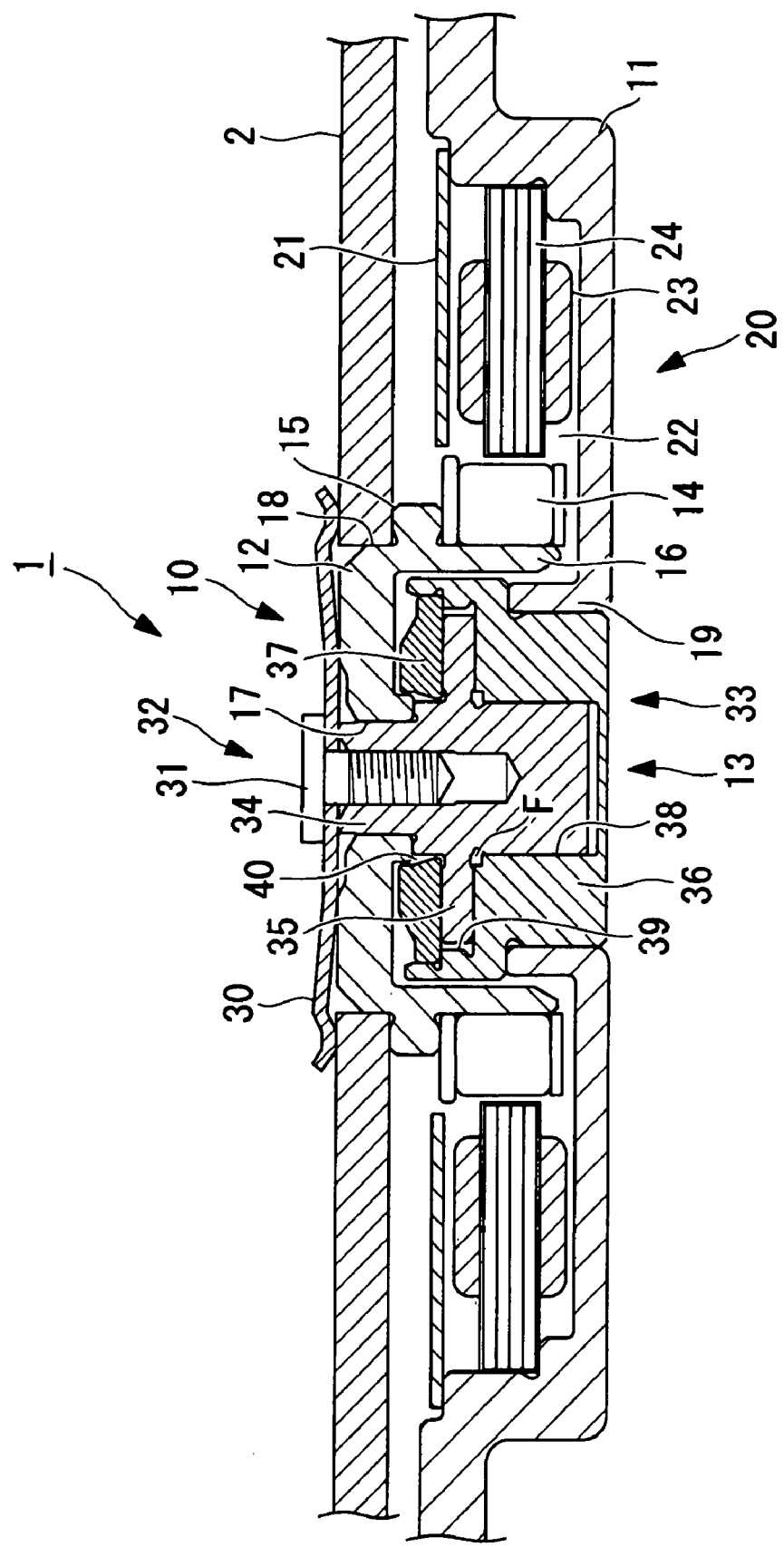
FIG. 2 is a cross-sectional view showing a main portion of the hard disk drive according to the embodiment of the present invention in which an inner rotor structure without a back yoke is employed as a structural example.

FIG. 2 is a cross-sectional view showing a main portion of the HDD 1 in which an inner rotor structure without a back yoke is employed as a structural example.

A motor 10 for rotationally driving the magnetic disk 2 includes a stator 11 including an electromagnet 20 circularly disposed, the rotor hub 12 including a permanent magnet 14 disposed so as to oppose the electromagnet 20 disposed inside the stator 11, and a fluid dynamic pressure bearing 13 for rotatably supporting the rotor hub 12 with respect to the stator 11. A magnetic force generating between the electromagnet 20 included in the stator 11 and the permanent magnet 14 included in the rotor hub 12 rotationally drives the rotor hub 12 with respect to the stator 11.

The permanent magnet 14 is circularly formed and has a rectangular cross section. The cup-shaped rotor hub 12 is formed with the disk mounting surface 15 having a collar shape protruding from an outer circumference of a side wall of the rotor hub 12, a magnet holding portion 16 for holding the permanent magnet 14, and a fitting portion (fixing portion) 18 formed on a center axial line of the rotor hub 12, for fitting an fitting hole 17 into which a shaft 32 to be described later is fitted into the ring-shaped magnetic disk 2.

Into the fitting portion 18 of the rotor hub 12, the magnetic disk 2 is fitted, whereby the rotor hub 12 and the magnetic disk 2 are integrally formed. Further, into the fitting hole 17 of the rotor hub 12, one end portion of the shaft 32 including the clamp 30 is fitted, whereby the rotor hub 12 and the shaft 32 are integrally formed. Accordingly, the shaft 32, the rotor hub 12, and the magnetic disk 2 integrally rotate.

The clamp 30 is an elastic member having a substantially circular plate shape, and has a center portion fixed to an upper end portion of the shaft 32 via a bolt 31. The clamp 30 is fixed to a predetermined position of the shaft 32, and formed in a shape with which the magnetic disk 2 is downwardly pressurized.

The stator 11 is formed with a boss portion 19 in a substantially center axis of the electromagnet 20. Into the boss portion 19, a housing 33 of the fluid dynamic pressure bearing 13 to be described later is fitted, whereby the permanent magnet 14 included in the rotor hub 12 opposes the electromagnet 20.

Between the electromagnet 20 and the magnetic disk 2, there is provided a shield plate 21 for shielding a magnetic field generated by the electromagnet 20 and the permanent magnet 14. The shield plate 21 is a circular plate formed substantially in a center thereof with a hole in which the rotor hub 12 is inserted.

The stator 11 is formed with a stator opening portion 22 for accommodating a coil 23 of the electromagnet 20 to be described later. The coil 23 is accommodated in the stator opening portion 22 as described above, so a disposing position of the electromagnet 20 is allowed to be closer to the stator 11 side (lower portion in the figure), with the result that the HDD 1 can be thinned.

As shown in FIG. 2, the fluid dynamic pressure bearing 13 includes the shaft 32, and the housing 33 for accommodating the shaft 32. The shaft 32 includes a substantially-columnar shaft body 34, and a thrust bearing plate 35 having a collar shape extending in a radius direction of the shaft 32 from an entire outer circumferential surface thereof at a midst portion in an axis direction of the shaft body 34. A minute gap is formed between an inner surface of the housing 33 and an outer surface of the shaft 32. Oil F is filled in the gap formed between the inner surface of the housing 33 and the outer surface of the shaft 32.

The shaft body 34 and the thrust bearing plate 35 integrally form the shaft 32. In an outer circumference surface of a lower end (lower end of FIG. 2) side of the shaft body 34, there are formed a plurality of radial dynamic pressure grooves called herringbone grooves. In end surfaces of the thrust bearing plate 35 in a thickness direction thereof, there are formed a plurality of thrust dynamic pressure generation grooves called herringbone grooves.

The housing 33 includes a substantially-cylindrical housing main body 36 having one end clogged and another end released, and an upper plate 37 for closing the released end of the housing 33 while protruding an end of the shaft body 34. The housing main body 36 is formed with a radial portion accommodating hole 38 for accommodating the lower end side of the shaft body 34 in which the radial dynamic pressure generation grooves are formed, and a thrust portion accommodating hole 39 for accommodating the thrust bearing plate 35.

The upper plate 37 has a ring plate shape, and is formed substantially in a center portion of the ring plate with a penetrating hole 40 in which the shaft body 34 is inserted. An inner circumferential surface of the penetrating hole 40 has a tapered surface in which a diameter thereof is gradually increased outwardly from the thrust portion accommodating hole 39. As a result, between a circumferential surface of the shaft body 34 inserted in the penetrating hole 40 and an inner circumferential surface of the penetrating hole 40, a circular capillary seal is formed such that the gap therebetween is enlarged outwardly. The capillary seal can, owing to its shape and surface tension of oil, hold the oil F filled in the gap between the housing 33 and the shaft 32 so as not to leak to the outside.

As described above, the HDD 1 includes the magnetic disk 2 rotationally driven by the motor 10, for performing recording/reproducing information, the rotor hub 12 including the disk mounting surface 15 on which the magnetic disk 2 is mounted, and the clamp 30 for pressurizing and fixing the magnetic disk 2 to the disk mounting surface 15. In the HDD 1, in the vicinity of the relatively-narrow edge portion of the disk mounting surface 15 to which the pressurizing force by the clamp 30 is applied, in order to prevent deformation hindering accurate recording/reproducing of the magnetic disk 2 from generating, the recessed portions of the pores having a length of 10 μm or more in the circumferential direction are not allowed to exist.

In addition, with regard to the projecting portions of the cutting marks on the disk mounting surface 15, the pores are not allowed to exist on both the projecting portion located in the outermost circumference and the projecting portion located adjacent thereto inwardly.

Herein, the length in the circumferential direction means the length in a circumferential direction of the disk mounting surface 15 having a ring shape in a plan view. Further, the vicinity of the edge portion means the edge portion of the inner circumferential side or the edge portion of the outer circumferential side of the disk mounting surface 15 having the ring shape in a plan view.

To be more specific, in order to prevent the minute deformation hindering accurate recording/reproducing from occurring in the magnetic disk 2, an austenitic stainless steel is used as a material of the rotor hub 12 forming the disk mounting surface 15, which is changed from a conventionally-used ferritic stainless steel.

This is because a JIS standard defining components of an austenitic stainless steel does not substantially contain tellurium (Te) and selenium (Se) each of which is an additive for improving machinability contained in a ferritic stainless steel. Further, the flat disk mounting surface 15 in which there occurs no relatively-large minute deformation hindering accurate recording/reproducing can be readily formed. In particular, in machining the disk mounting surface 15 of the rotor hub 12, it is preferable to select a material containing no tellurium which is considered to be a main cause for forming recessed portions caused by fallen component particles.

It has been found that, recessed portions of large holes generate in the machined surface, because an additive for improving free-machinability is not allowed to, owing to tellurium, flatten in the material rolling step, and becomes rounded to widely distribute, and a portion exposed to the machined surface falls off. Accordingly, any stainless steel containing the additive for improving free-machinability but no tellurium can achieve the similar effect whether it is martensite-based or ferritic.

The material change needs to be made at least in the portion forming the disk mounting surface 15. Accordingly, the material may be partially changed while the rotor hub 12 has a structure separated from the disk mounting surface 15. Alternatively, the material may be entirely changed while the rotor hub 12 has a structure integrated with the disk mounting surface 15. Note that an austenitic stainless steel is a nonmagnetic material, so, when a nonmagnetic material is used as a material for the entire rotor hub 12, the magnet holding portion 16 never serves as a back yoke.

Figure 3:
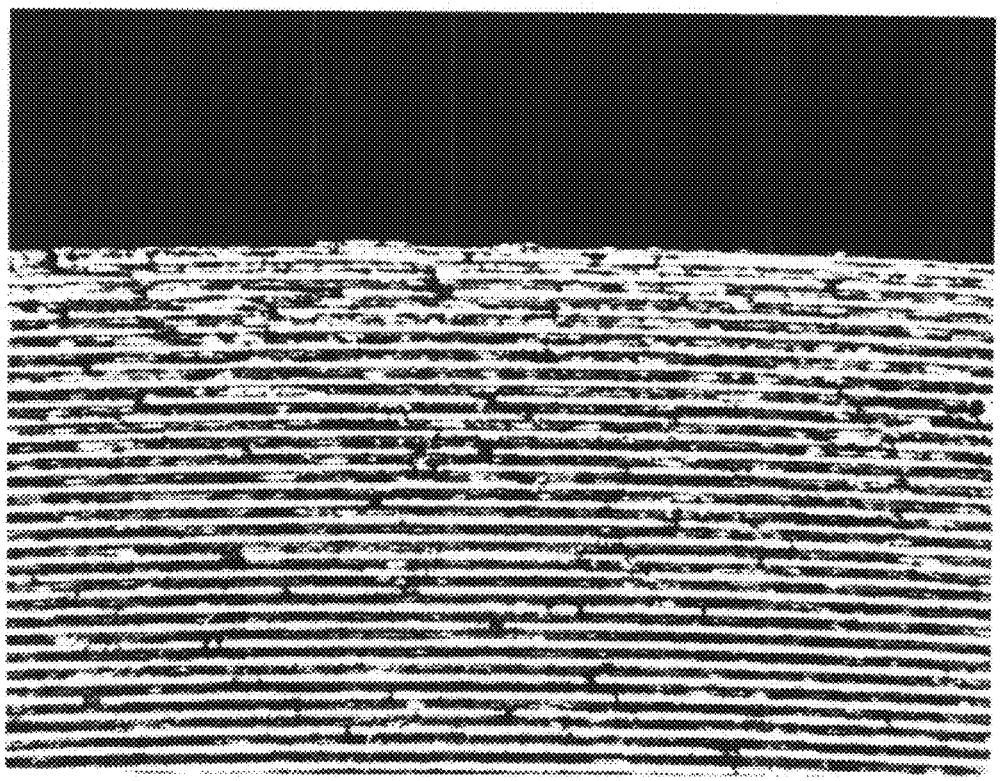
FIG. 3 is an enlarged photograph showing a state of a front surface of the disk mounting surface according to the embodiment of the present invention, which has been machine-processed and is viewed from the above.

Owing to such a material change, in the disk mounting surface 15 made of an austenitic stainless steel (SUS 303), as apparent from an enlarged photograph shown in FIG. 3, for example, in the edge portion to which the pressurizing force by the clamp is applied and in the vicinity thereof, there exists no recessed portion of relatively-large pores having a length of 10 μm or more in a circumferential direction. In addition, with regard to the projecting portions of the cutting marks on the disk mounting surface 15, the pores do not exist on both the projecting portion located in the outermost circumference and the projecting portion located adjacent thereto inwardly. As a result, even though the magnetic disk 2 on the flat disk mounting surface 15 is pressurized by the clamp 30, there occurs no relatively-large minute deformation hindering accurate recording/reproducing.

Figure 4A:
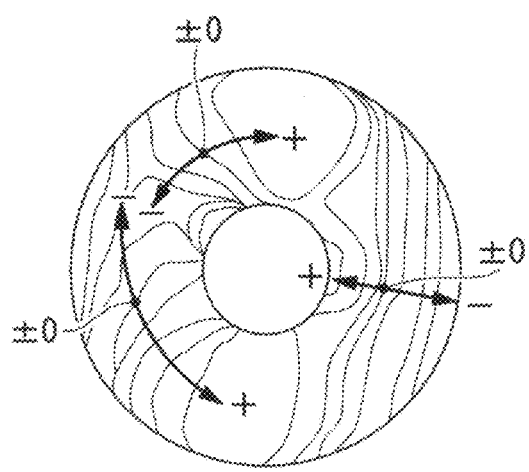
FIG. 4 is a diagram showing minute deformation of a magnetic disk on the disk mounting surface of FIG. 3.
Figure 4B:
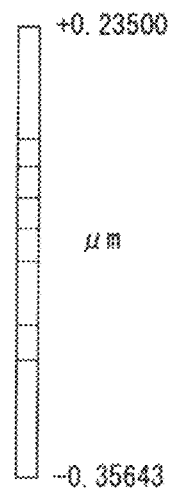
Figure 9A:
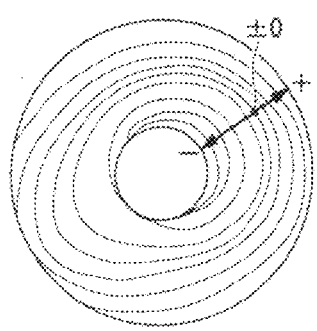
FIG. 9 is a diagram showing minute deformation of a magnetic disk on the disk mounting surface of FIG. 8.
Figure 9B:
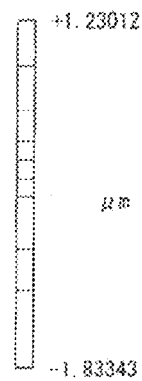

FIG. 4 shows a deformed state where, at a predetermined position of the disk mounting surface 15 made of an austenitic stainless steel, the magnetic disk 2 pressurized and fixedly supported by the clamp 30 is caused to minutely deform. Note that deformation amount scales of FIGS. 4 and 9 are different from each other.

With reference to FIG. 4, an entire surface of the magnetic disk 2 supported by the disk mounting surface 15 becomes uneven. However, a deformation amount thereof is minute. To be specific, a maximum deformation amount, which is obtained by summing the largest recess (−0.35643 μm) and the largest protrusion (+0.23500 μm), is less than 0.6 μm. This is reduced by approximately 80% from the deformation amount of approximately 3 μm in the conventional example of FIG. 9.

As described above, in the case where the relatively-large pores of fallen particles having a length of 10 μm or more in the circumferential direction do not exist in the vicinity of the edge portion of the disk mounting surface 15 to which the pressurizing force by the clamp 30 is applied, there occurs no relatively-large minute deformation hindering accurate recording/reproducing of the magnetic disk 2 fixedly supported by the flat disk mounting surface 15. Accordingly, even in the HDD 1 employing the high-density thin magnetic disk 2, recording/reproducing can be accurately performed. Thus, an information recording/reproducing apparatus employing the HDD 1 can be downsized and thinned, and information can be accurately recorded/reproduced.

Meanwhile, the above-mentioned disk mounting surface 15 according to this embodiment of the present invention is not limited to the HDD 1 (inner rotor structure without a back yoke) of FIG. 2. Alternatively, the disk mounting surface 15 can be similarly adopted to a HDD disk mounting surface having another structure such as an inner rotor structure having a back yoke as shown in FIG. 5 or an outer rotor structure having a back yoke as shown in FIG. 6.

Hereinafter, the inner rotor structure having a back yoke and the outer rotor structure having a back yoke will be briefly described with reference to the drawings. Note that similar reference numerals are attached to structural components similar to those of the embodiment described above, and detailed description thereof will be omitted.

Figure 5:
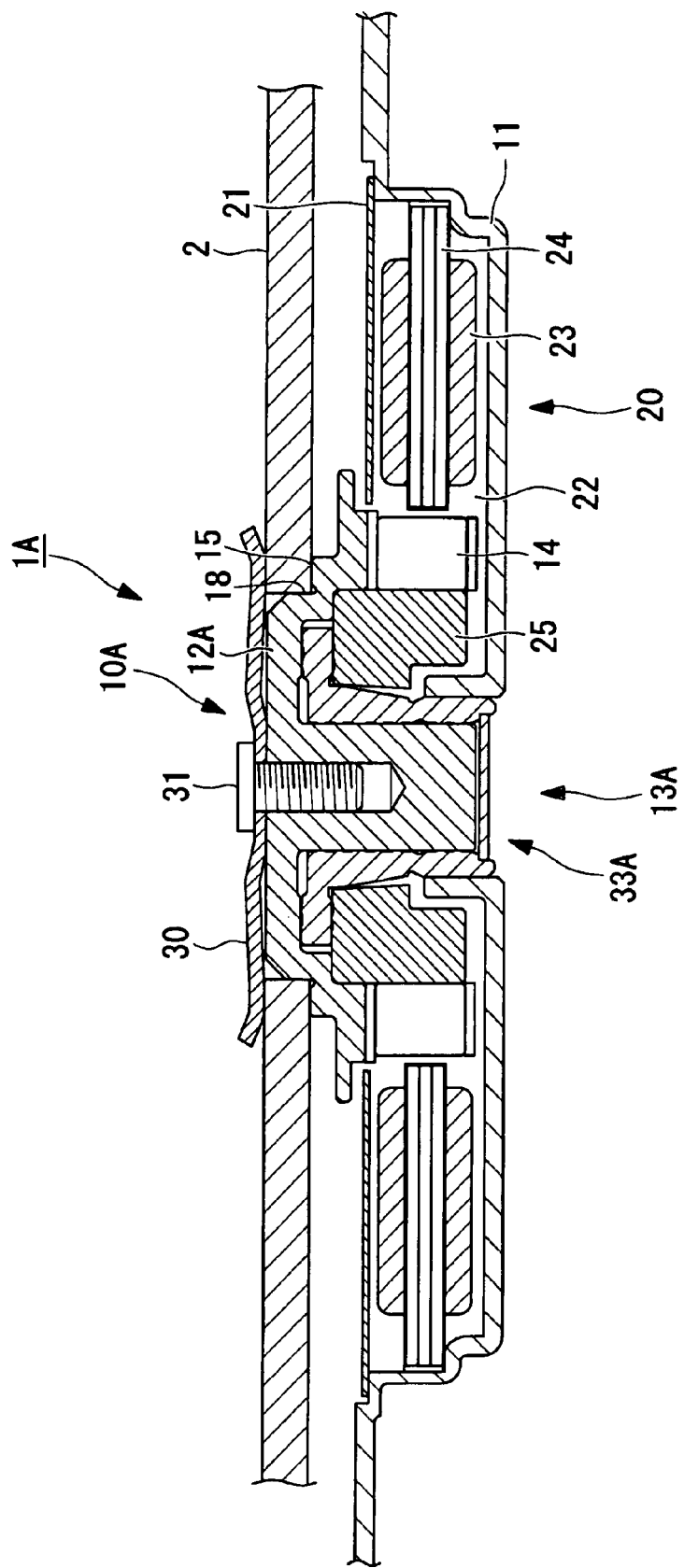
FIG. 5 is a cross-sectional view showing a main portion of a hard disk drive according to another embodiment of the present invention, in which an inner rotor structure having a back yoke is employed as another structural example.
Figure 6:
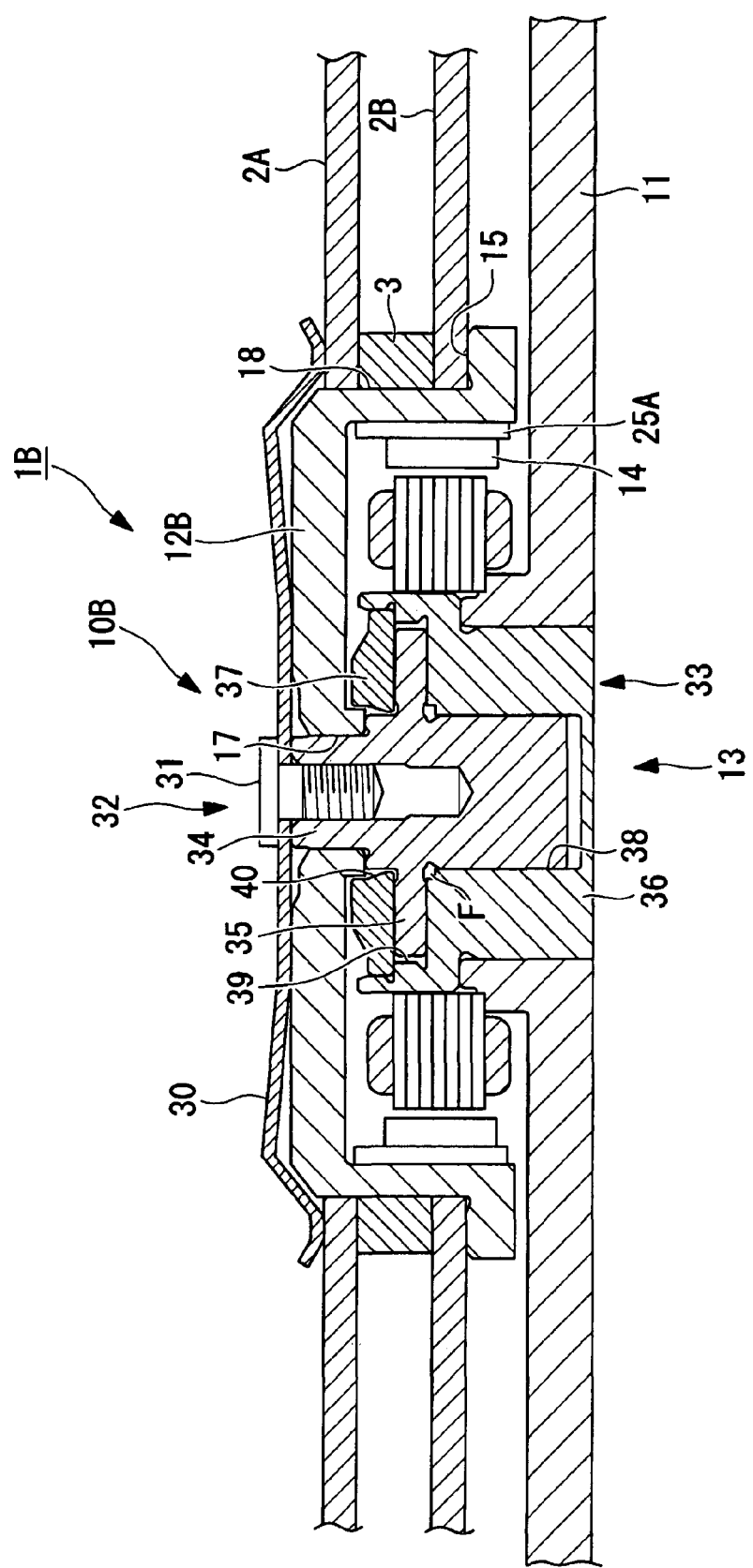
FIG. 6 is a cross-sectional view showing a main portion of the hard disk drive according to another embodiment of the present invention in which an outer rotor structure having a back yoke is employed as still another structural example.
Figure 7:
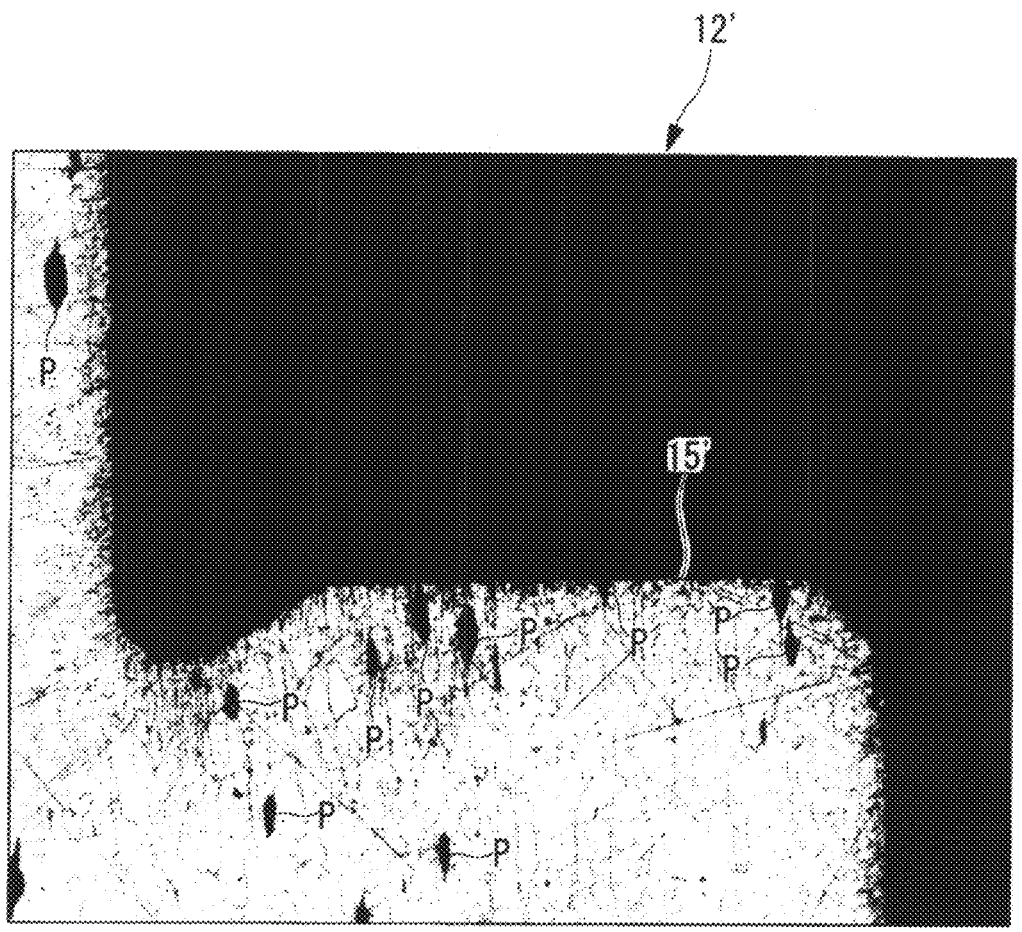
FIG. 7 is a photograph showing a cross section of a related art disk mounting surface while the cross section is taken at 400-magnification.
Figure 8:
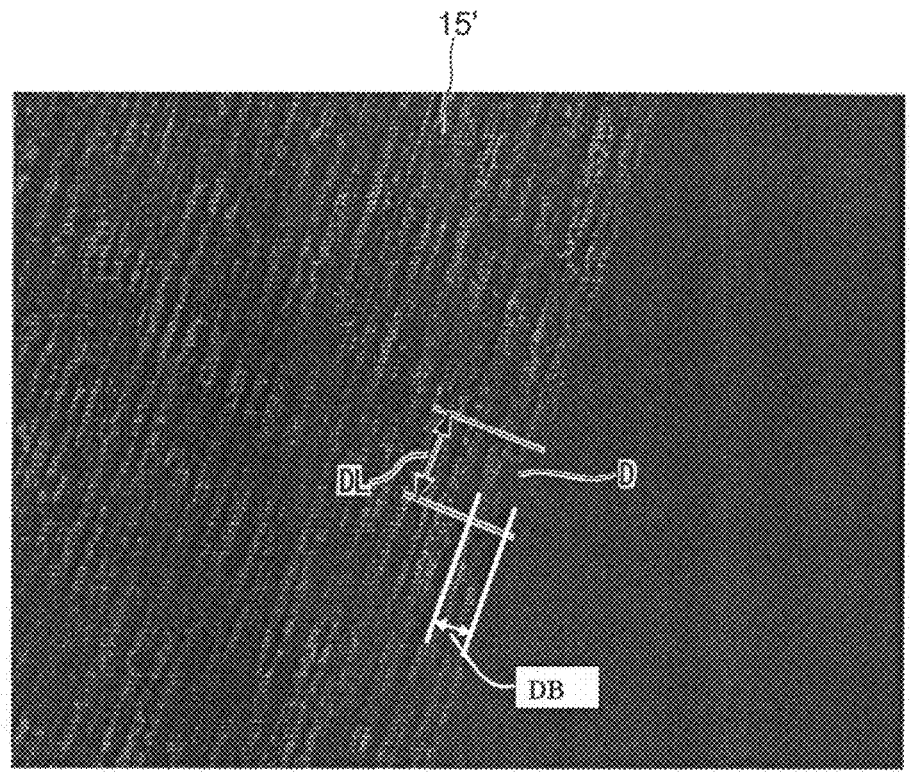
FIG. 8 is an enlarged photograph showing a state of a front surface of the conventional disk mounting surface, which has been machine-processed.

A HDD 1A shown in FIG. 5 has the inner rotor structure having a back yoke. In this case, a motor 10A for rotationally driving the magnetic disk 2 includes the stator 11 including the electromagnet 20, a rotor hub 12A including the permanent magnet 14 disposed so as to oppose the electromagnet 20 disposed inside the stator 11, and a fluid dynamic pressure bearing 13A for rotatably supporting the rotor hub 12A with respect to the stator 11. Further, in an inner circumferential surface side of the permanent magnet 14, there is provided a back yoke 25 made of a magnetic material.

Further, the clamp 30 is located at a center portion of the rotor hub 12A, and directly fixed by the bolt 31. Note that a housing 33A shown in FIG. 5 accommodates the fluid dynamic pressure bearing 13A.

Also in the HDD 1A as structured above, the disk mounting surface 15 on which the magnetic disk 2 is mounted is formed in the rotor hub 12A. In addition, in the edge portion of the disk mounting surface 15 to which the pressurizing force by the clamp 30 is applied and in the vicinity thereof, in order to prevent deformation hindering accurate recording/reproducing of the magnetic disk 2 from generating, the recessed portions of the pores having a length of 10 μm or more in the circumferential direction are not allowed to exist. Further, with regard to the projecting portions of the cutting marks on the disk mounting surface 15, the pores are not allowed to exist on both the projecting portion located in the outermost circumference and the projecting portion located adjacent thereto inwardly.

To be specific, an austenitic stainless steel is used as a material of the rotor hub 12A forming the disk mounting surface 15, to thereby prevent the formation of the recessed portions caused by fallen component particles. Accordingly, in the magnetic disk 2 fixedly supported by the flat disk mounting surface 15, even though the magnetic disk 2 is pressurized by the clamp 30, there occurs no relatively-large minute deformation hindering accurate recording/reproducing.

A HDD 1B shown in FIG. 6 has the outer rotor structure having a back yoke. In this case, there is employed a structural example in which magnetic disks 2A and 2B are vertically superimposed in a double layer while a spacer 3 is sandwiched therebetween. However, the structure is not limited thereto.

A motor 10B for rotationally driving the magnetic disks 2A and 2B includes the stator 11 including the electromagnet 20, a rotor hub 12B including the permanent magnet 14 disposed so as to oppose an outer circumferential side of the electromagnet 20, and the fluid dynamic pressure bearing 13 for rotatably supporting the rotor hub 12B with respect to the stator 11. Further, in an outer circumferential surface side of the permanent magnet 14, there is provided a back yoke 25A made of a magnetic material.

Also in the HDD 1B as structured above, the disk mounting surface 15 on which the lower magnetic disk 2B is mounted is formed in the rotor hub 12B. In addition, to the disk mounting surface 15 on which the magnetic disk 2B is mounted, the pressurizing force by the clamp 30 is applied via the upper disk 2A and the spacer 3. In the edge portion of the disk mounting surface 15 and in the vicinity thereof, in order to prevent deformation hindering accurate recording/reproducing of the magnetic disk 2B from generating, the recessed portions of the pores having a length of 10 μm or more in the circumferential direction are not allowed to exist. Further, with regard to the projecting portions of the cutting marks on the disk mounting surface 15, the pores are not allowed to exist on both the projecting portion located in the outermost circumference and the projecting portion located adjacent thereto inwardly.

To be specific, an austenitic stainless steel is used as a material of the rotor hub 12B forming the disk mounting surface 15, to thereby prevent the formation of the recessed portions caused by fallen component particles. Accordingly, in the magnetic disk 2B fixedly supported by the flat disk mounting surface 15, even though the magnetic disk 2B is pressurized by the clamp 30, there occurs no relatively-large minute deformation hindering accurate recording/reproducing.

According to the hard disk drive of the present invention, in the edge portion of the disk mounting surface 15 to which the pressurizing force by the clamp 30 is applied and in the vicinity thereof, the recessed portions of the pores having a length of 10 μm or more in the circumferential direction are not allowed to exist. Further, with regard to the projecting portions of the cutting marks on the disk mounting surface 15, the pores are not allowed to exist on both the projecting portion located in the outermost circumference and the projecting portion located adjacent thereto inwardly. Thus, there generates no minute deformation hindering accurate recording/reproducing of the magnetic disk 2, 2A, or 2B. Accordingly, even in employing the high-density thin plate-like magnetic disk 2, 2A, or 2B, information can be accurately recorded/reproduced. Thus, the information recording/reproducing apparatus employing the hard disk drive can be downsized and thinned, and at the same time, information can be accurately recorded/reproduced.

Note that the present invention is not limited to the above-mentioned embodiments, and can be modified as required without departing from the gist of the present invention.

What is claimed is:

1. A hard disk drive, comprising:
an information recording medium that is rotationally driven for recording and/or reproducing information; and
a rotor hub having a flat mounting surface disposed in an outer circumferential portion thereof and on which the information recording medium is mounted so as to contact an edge portion of the mounting surface, the mounting surface being made of an austenitic stainless steel containing a machineability improving additive, except for selenium and tellurium, for improving the machineability of the mounting surface, at least one of the edge portion or a portion of the mounting surface in the vicinity of the edge portion containing surface pores formed by component particles of the additive falling from the mounting surface, each of the pores having a length less than 10 μm in a circumferential direction of the mounting surface.

2. A hard disk drive according to claim 1; wherein the edge portion comprises an outermost circumferential portion of the mounting surface.

3. A hard disk drive according to claim 1; further comprising biasing means for bringing the information recording medium into pressure contact with the edge portion of the mounting surface.

4. A hard disk drive according to claim 3; wherein the biasing means comprises an elastic clamp member.

5. A hard disk drive according to claim 1; wherein the mounting surface of the rotor hub is free of grooves or tracks.

6. A hard disk drive according to claim 1; further comprising a clamp that applies pressure to the information recording medium against the mounting surface of the rotor hub to integrally mount the information recording medium on the mounting surface of the rotor hub.

* * * * *